(12) United States Patent
Boisselle et al.

(10) Patent No.: US 12,459,851 B2
(45) Date of Patent: Nov. 4, 2025

(54) METHOD OF SHAPING A GLASS SHEET AND GLASS SHAPING LINE UTILIZED THEREIN

(71) Applicant: PILKINGTON GROUP LIMITED, Lathom (GB)

(72) Inventors: Robert J. Boisselle, Maumee, OH (US); John Stephan Tomik, Lasalle, MI (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 18/221,579

(22) Filed: Jul. 13, 2023

(65) Prior Publication Data

US 2023/0357068 A1    Nov. 9, 2023

Related U.S. Application Data

(63) Continuation of application No. 16/348,193, filed as application No. PCT/GB2017/053414 on Nov. 13, 2017, now abandoned.
(Continued)

(51) Int. Cl.
*C03B 23/03* (2006.01)
*C03B 23/035* (2006.01)
(Continued)

(52) U.S. Cl.
CPC ........ *C03B 23/0302* (2013.01); *C03B 23/035* (2013.01); *C03B 23/0357* (2013.01);
(Continued)

(58) Field of Classification Search
CPC ......................................... C03B 23/035–0355
See application file for complete search history.

(56) References Cited

U.S. PATENT DOCUMENTS

| 4,204,854 A | 5/1980 | McMaster |
| 4,217,126 A | 8/1980 | Hagedorn et al. |

(Continued)

FOREIGN PATENT DOCUMENTS

| CN | 1649798 A | 8/2005 |
| CN | 101432236 A | 5/2009 |

(Continued)

OTHER PUBLICATIONS

European Patent Office, International Search Report with Written Opinion issued in PCT/GB2017/053414, dated Feb. 1, 2018, 13 pages, European Patent Office, Rijswijk, Netherlands.
(Continued)

*Primary Examiner* — Erin Snelting
(74) *Attorney, Agent, or Firm* — Marshall & Melhorn, LLC

(57) ABSTRACT

A method of shaping a glass sheet includes providing a glass sheet. Also, a bending station is provided. The bending station includes a first bending tool. The first bending tool has a shaping surface for receiving the glass sheet. The glass sheet is conveyed on a plurality of rollers to a location above the first bending tool. At least a portion of the glass sheet is supported above the first bending tool by delivering a flow of fluid to a major surface of the glass sheet. The glass sheet is deposited on the shaping surface of the first bending tool.

20 Claims, 6 Drawing Sheets

Related U.S. Application Data

(60) Provisional application No. 62/421,041, filed on Nov. 11, 2016.

(51) Int. Cl.
*C03B 35/16* (2006.01)
*C03B 35/24* (2006.01)

(52) U.S. Cl.
CPC ............ *C03B 35/16* (2013.01); *C03B 35/243* (2013.01); *C03B 2225/02* (2013.01)

(56) References Cited

U.S. PATENT DOCUMENTS

| | | |
|---|---|---|
| 4,606,749 A | 8/1986 | Nushi et al. |
| 4,682,997 A | 7/1987 | Halberschmidt et al. |
| 4,738,704 A | 4/1988 | Vanaschen et al. |
| 4,753,668 A | 6/1988 | Honjo |
| 4,859,225 A | 8/1989 | Kuster et al. |
| 4,865,638 A | 9/1989 | Kudo |
| 5,009,695 A | 4/1991 | Kuster et al. |
| 5,622,539 A * | 4/1997 | Lesage .................. C03B 35/24 65/273 |
| 5,900,034 A | 5/1999 | Harold |
| 6,044,662 A * | 4/2000 | Morin .................. C03B 23/0252 65/106 |
| 2005/0061034 A1 | 3/2005 | Boisselle et al. |
| 2005/0223745 A1 | 10/2005 | Nikander |
| 2006/0277947 A1 | 12/2006 | Funk et al. |
| 2008/0245107 A1 | 10/2008 | Bennett |
| 2009/0084138 A1 | 4/2009 | Imaichi et al. |
| 2014/0260431 A1 | 9/2014 | Nitschke et al. |
| 2015/0218030 A1 | 8/2015 | Nitschke |
| 2016/0039706 A1 | 2/2016 | Nitchke |
| 2018/0155232 A1 | 6/2018 | Tomik |

FOREIGN PATENT DOCUMENTS

| | | |
|---|---|---|
| CN | 101801865 A | 8/2010 |
| JP | 2010531797 A | 9/2010 |
| WO | 03082754 A1 | 10/2003 |
| WO | 2008124258 A1 | 10/2008 |
| WO | 200162680 A1 | 8/2011 |

OTHER PUBLICATIONS

China Inational Ntellectual Property Administration, Office Action issue in application No. CN201780079995.7 dated May 31, 2021, 24 pages.

Japan Patent Office, Office Action in Application No. JP2019-524431, dated Sep. 21, 2021, 7 pages.

* cited by examiner

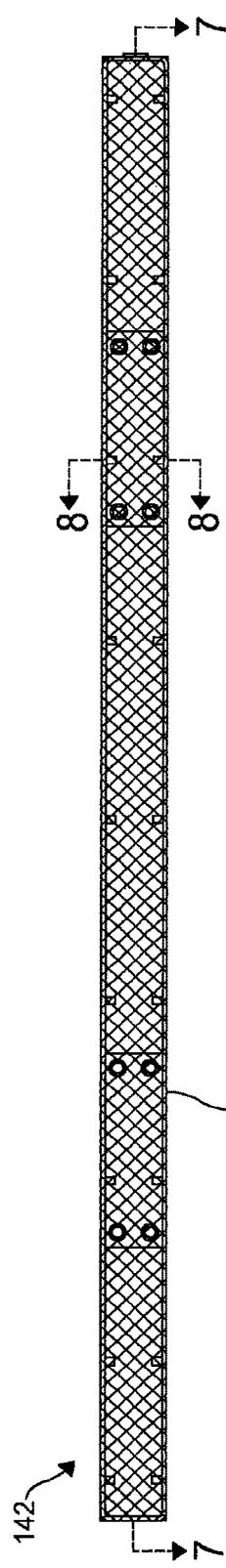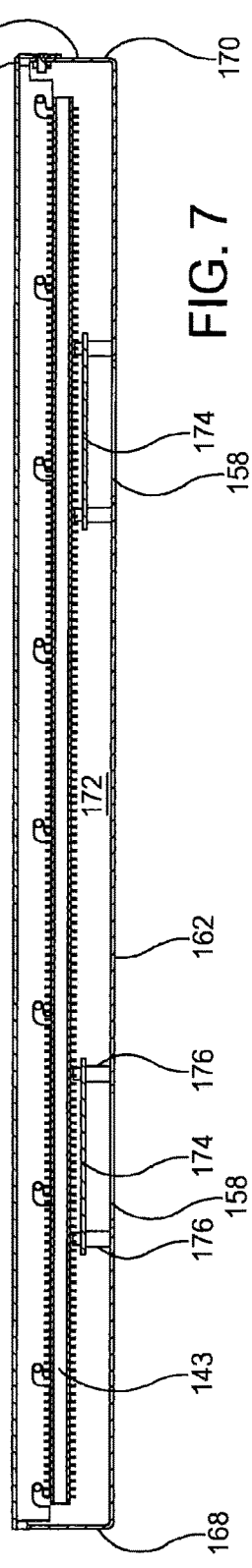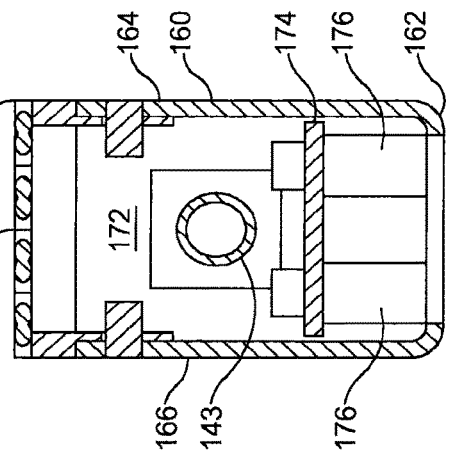

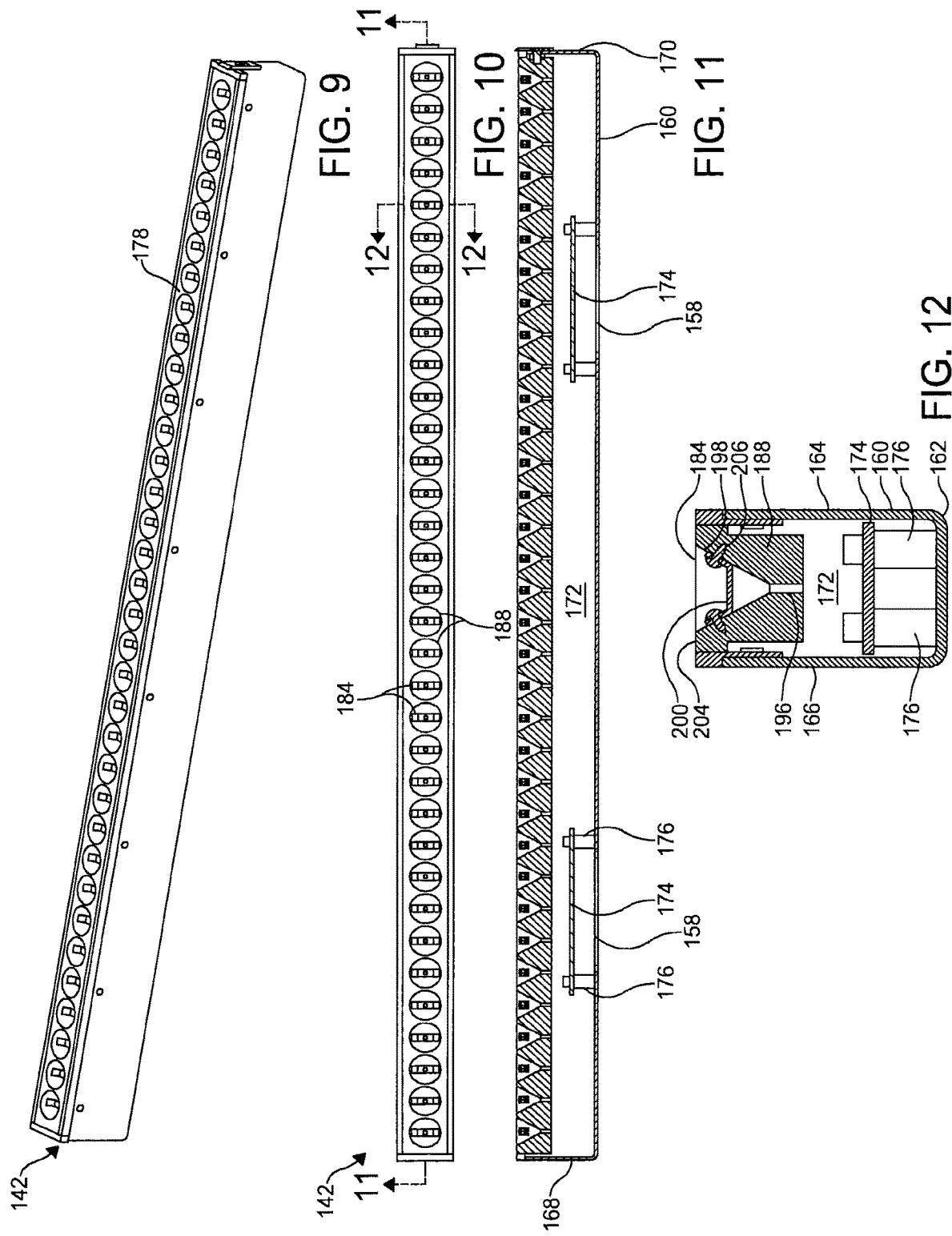

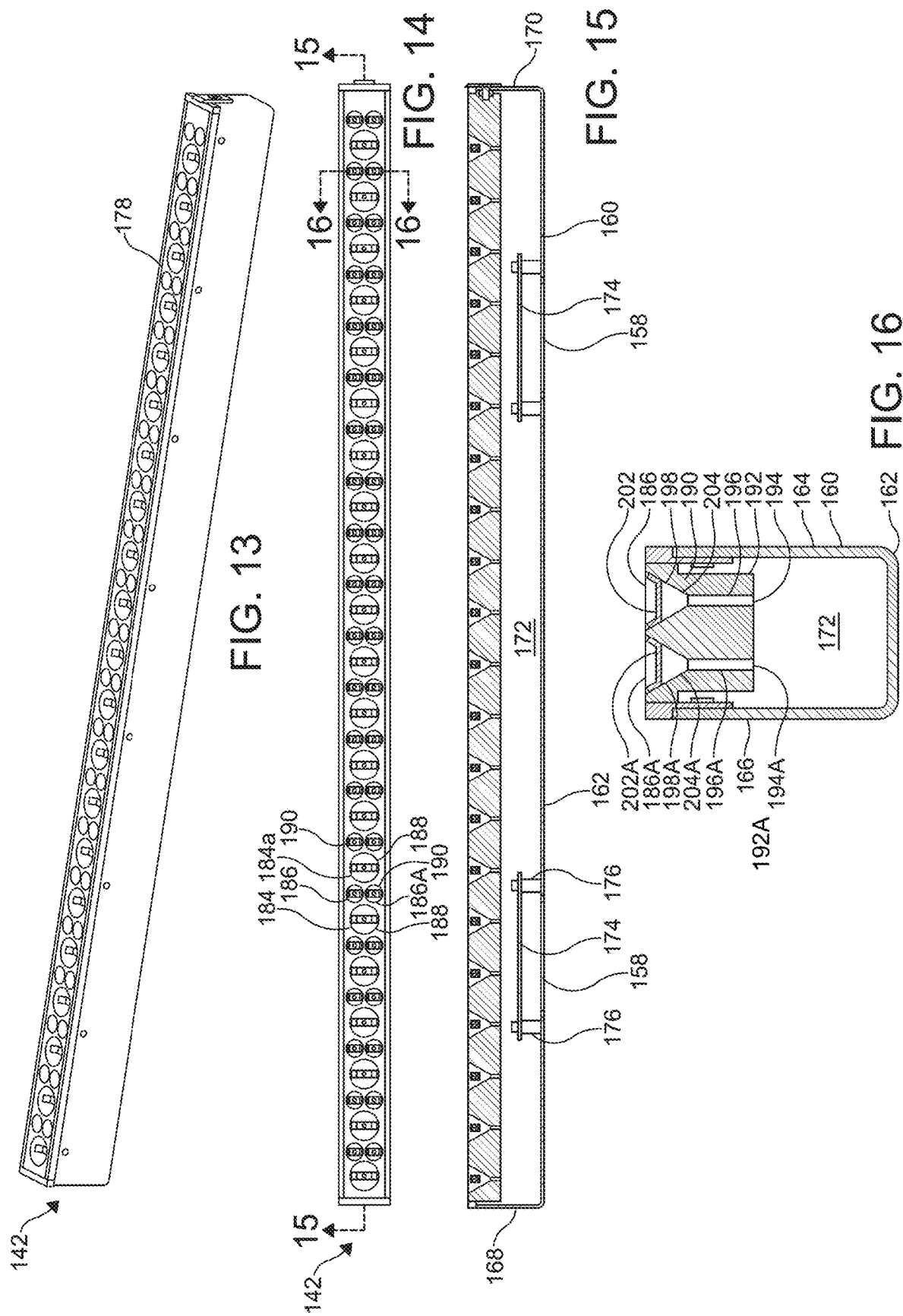

METHOD OF SHAPING A GLASS SHEET AND GLASS SHAPING LINE UTILIZED THEREIN

CROSS-REFERENCE TO RELATED APPLICATION

This application is claiming the benefit, under 35 U.S. C. 119(e), of the provisional U.S. patent application which was granted Ser. No. 62/421,041 and filed on Nov. 11, 2016, the entire disclosure of which is hereby incorporated by reference.

BACKGROUND OF THE INVENTION

The invention relates to shaping a glass sheet. More particularly, the invention relates to a method of shaping a glass sheet and a glass shaping line that improves shaping and at least partially eliminates defects on the glass sheet.

Various processes are known for shaping or bending a sheet of glass. In certain bending processes, the heated glass sheet is supported on a ring member and allowed to sag under the influence of gravity, with or without the assistance of an additional pressing force. Another known glass sheet bending process is a press bending process whereby a glass sheet (or a nested pair) is bent between a pair of complementary shaping members, usually in a spaced vertical relationship.

Prior to bending, the glass sheet may be heated to the bending temperature in an associated furnace and moved using a series of rollers. Vertically movable stops may facilitate positioning the heated glass sheet in the direction of travel before bending. However, positioning of the heated glass sheet in other directions, such as substantially perpendicular to the direction of glass travel, is only performed on the rollers, prior to entry of the glass sheet into the furnace. Consequently, alignment of the glass sheet before the bending process may not be ideal, which may result in the glass sheet not having the desired properties or a product that possess poor quality. Furthermore, contact between the rollers and the glass sheet immediately before the glass sheet is transferred to the bending tools may result in marks on the glass sheet that cause optical distortion.

Thus, it would be advantageous to develop a method of shaping a glass sheet and a glass shaping line that overcomes the aforementioned problems.

Accordingly from a first aspect the present invention provides a method of shaping a glass sheet, comprising: providing a glass sheet; providing a bending station comprising a first bending tool, the first bending tool having a shaping surface for receiving the glass sheet; conveying the glass sheet on a plurality of rollers to a location above the first bending tool; supporting at least a portion of the glass sheet above the first bending tool by delivering a flow of fluid to a major surface of the glass sheet; and depositing the glass sheet on the shaping surface of the first bending tool.

Preferably the method further comprises moving the plurality of rollers in a direction toward the first bending tool prior to depositing the glass sheet on the first bending tool.

Preferably the method further comprises supporting the glass sheet on the shaping surface of the first bending tool.

Preferably the method further comprises conveying the glass sheet on the plurality of rollers at a height and wherein the flow of fluid delivered to the major surface of the glass sheet raises the glass sheet above the height.

Preferably the method further comprises adjusting the position of the glass sheet relative to the shaping surface of the first bending tool after depositing the glass sheet on the shaping surface of the first bending tool.

Preferably the method further comprises heating the glass sheet in a preheating furnace and transferring the glass sheet to the plurality of rollers.

Preferably the method further comprises moving the first bending tool in a direction toward the plurality of rollers prior to depositing the glass sheet on the first bending tool.

Preferably the flow of fluid delivered to the major surface of the glass sheet is terminated before or after the glass sheet is deposited on the shaping surface of the first bending tool.

Preferably the flow of fluid is heated.

Preferably the flow of fluid comprises air.

In some embodiments the method further comprises adjusting the position of the glass sheet relative to the shaping surface of the first bending tool prior to depositing the glass sheet on the shaping surface of the first bending tool.

Preferably the flow of fluid delivered to the major surface of the glass sheet is terminated after the position of the glass sheet has been adjusted.

Preferably the flow of fluid delivered to the major surface of the glass sheet is terminated after the position of the glass sheet has been adjusted and the flow of fluid delivered to the major surface of the glass sheet is terminated before or after the glass sheet is deposited on the shaping surface of the first bending tool.

In some embodiments the method further comprises discharging the flow of fluid from a fluid pad assembly.

Preferably the fluid pad assembly comprises one or more fluid pads.

When the fluid pad assembly comprises one or more fluid pads, preferably the one or more fluid pads are spaced apart from each other.

When the fluid pad assembly comprises one or more fluid pads, preferably the flow of fluid is received by the fluid pad assembly at a first pressure and is at a second pressure within the one or more fluid pads, wherein the first pressure of the flow of fluid is greater than the second pressure of the flow of fluid.

Preferably the method further comprises heating the flow of fluid before discharging the flow of fluid from the fluid pad assembly.

The present invention also provides from a second aspect a glass shaping line, comprising: a bending station comprising a first bending tool, the first bending tool having a shaping surface for receiving a glass sheet; a plurality of rollers for conveying the glass sheet to a location above the first bending tool; and a fluid pad assembly comprising one or more fluid pads, each fluid pad configured to deliver a flow of fluid to a major surface of the glass sheet for supporting at least a portion of the glass sheet above the first bending tool.

Preferably the glass shaping line further comprises a centering device, the centering device comprising a first positioner disposed about a peripheral edge of the first bending tool, the first positioner configured to position the glass sheet relative to the shaping surface of the first bending tool before the glass sheet is deposited on the shaping surface of the first bending tool.

In some embodiments the glass shaping line further comprises one or more controllers, the one or more controllers being in communication with one or more valves to provide a signal to the one or more valves to regulate the flow of fluid from one or more sources of fluid to the fluid pad assembly.

Preferably the glass shaping line further comprises a centering device for regulating the position of the glass sheet, wherein the one or more controllers are in communication with the centering device to provide a signal to the centering device to regulate positioning of the glass sheet, wherein the at least a portion of the glass sheet is supported above the first bending tool by the flow of fluid when the centering device regulates positioning of the glass sheet.

In some embodiments at least one fluid pad of the one or more fluid pads comprises an fluid inlet for receiving the flow of fluid from a source of fluid and an fluid outlet for discharging the flow of fluid from the fluid pad, wherein a chamber is provided between the fluid inlet and the fluid outlet.

Preferably at least one fluid pad further comprises a heating element positioned within the chamber, more preferably wherein the heating element is further positioned between a diffuser plate and the fluid outlet.

Preferably the fluid outlet comprises one or more openings which are formed in a cover member.

Preferably the glass shaping line further comprises a diffuser plate provided in a spaced apart relationship with the fluid inlet, the diffuser plate receiving the flow of fluid from the fluid inlet and distributing the flow of fluid laterally within the fluid pad.

BRIEF SUMMARY OF THE INVENTION

Embodiments of a method of shaping a glass sheet are provided. In an embodiment, the method comprises providing a glass sheet. Also, a bending station is provided. The bending station comprises a first bending tool. The first bending tool has a shaping surface for receiving the glass sheet. The glass sheet is conveyed on a plurality of rollers to a location above the first bending tool. At least a portion of the glass sheet is supported above the first bending tool by delivering a flow of fluid to a major surface of the glass sheet. The glass sheet is deposited on the shaping surface of the first bending tool.

Also, embodiments of a glass shaping line are provided. In an embodiment, the glass shaping line comprises a bending station comprising a first bending tool. The first bending tool has a shaping surface for receiving a glass sheet. Also, the glass shaping line comprises a plurality of rollers for conveying the glass sheet to a location above the first bending tool and a fluid pad assembly comprising one or more fluid pads. Each fluid pad is configured to deliver a flow of fluid to a major surface of the glass sheet for supporting at least a portion of the glass sheet above the first bending tool.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 6 is a top view of an embodiment of a fluid pad suitable for use in the bending station of FIG. 3;

FIG. 7 is a sectional view of the fluid pad of FIG. 6 taken along line 7-7;

FIG. 8 is another sectional view of the fluid pad of FIG. 6 taken along line 8-8;

FIG. 9 is a perspective view of another embodiment of a fluid pad suitable for use in the glass shaping line of FIG. 1;

FIG. 10 is a top view of the fluid pad of FIG. 9;

FIG. 11 is a sectional view of the fluid pad of FIG. 10 taken along line 11-11;

FIG. 12 is another sectional view of the fluid pad of FIG. 10 taken along line 12-12;

FIG. 13 is a perspective view of yet another embodiment of a fluid pad suitable for use in the glass shaping line of FIG. 1;

FIG. 14 is a top view of the fluid pad of FIG. 13;

FIG. 15 is a sectional view of the fluid pad of FIG. 14 taken along line 15-15; and FIG. 16 is another sectional view of the fluid pad of FIG. 14 taken along line 16-16.

DETAILED DESCRIPTION OF THE INVENTION

It is to be understood that the invention may assume various alternative orientations and step sequences, except where expressly specified to the contrary. It is also to be understood that the specific methods, devices, apparatuses, and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements found in the aforementioned embodiments may be referred to with like identifiers within this section of the application.

Embodiments of a method of shaping a glass sheet and a glass shaping line utilized therein are described herein and with reference to FIGS. 1-16.

The glass sheet may be utilized as a portion of a window such as, for example, a windscreen for an automobile. However, the glass sheet may have other automotive applications. For example, the glass sheet may be utilized to form a side window, sunroof, or a rear window. Such a window may be monolithic or laminated. Additionally, the glass sheet may have other vehicle applications. For example, the glass sheet may have applications to on-highway and off-highway vehicles. Also, the glass sheet may have architectural, electronic, industrial, locomotive, naval, aerospace, and other applications.

In certain embodiments, the glass sheet may have a soda-lime-silicate composition. A typical soda-lime-silicate glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2% and $Fe_2O_3$ 0.005-2%. The glass composition may also contain other additives, for example, refining aids, which would normally be present in an amount of up to 2%. In other embodiments, the glass sheet may be of another composition. For example, the glass sheet may be of a borosilicate composition or an aluminosilicate composition. The glass sheet may have a thickness between 0.5-25 millimetres (mm), typically a thickness between 0.5-8 mm.

The shape of the glass sheet may vary between embodiments. However, in certain embodiments, the glass sheet may have a rectangular outline in plan view. Preferably, the glass sheet has a first major surface and a second major surface. The second major surface opposes the first major surface.

Figure 1:
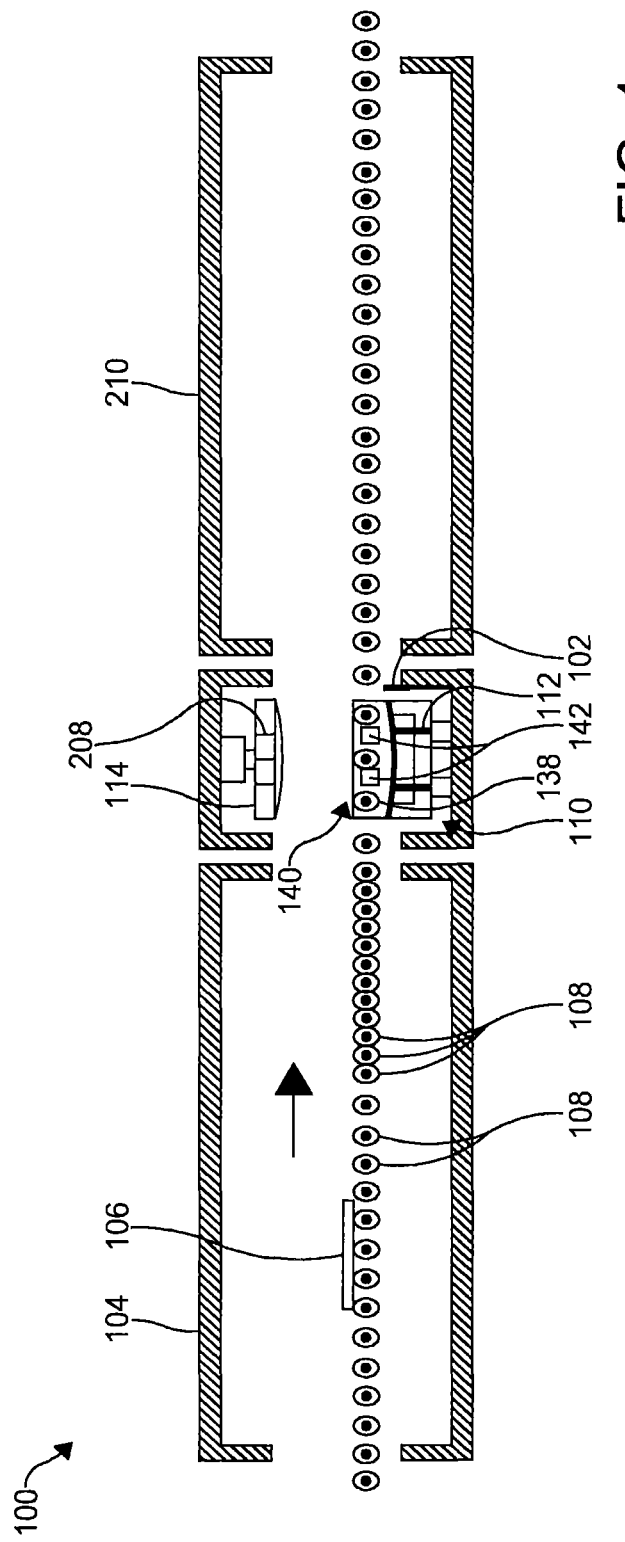
FIG. 1 is a schematic representation of an embodiment of a glass shaping line in accordance with the invention.

FIG. 1 illustrates an embodiment of the glass shaping line 100. In certain embodiments, the glass shaping line 100 is of the press bending variety. In other embodiments (not depicted), the glass shaping line is of the gravity bending variety.

Preferably, the glass shaping line 100 includes a preheating furnace 104. The preheating furnace 104 serves to heat the glass sheet 106 before bending of the glass sheet 106 occurs. In the preheating furnace 104, the glass sheet 106 is heated to a temperature suitable for shaping. For example, the glass sheet 106 may be heated to a temperature of 590-670° C. Accordingly, the glass sheet 106 may also be referred to as a heated glass sheet.

The glass sheet 106 is transported through the furnace 104 on rollers 108. The rollers 108 are spaced apart. The spacing of the rollers 108 is reduced near the exit of the preheating furnace 104, since a glass sheet 106 in the heated state is deformable and therefore requires greater support.

The preheating furnace 104 is followed by a bending station 110. The bending station 110 comprises a first bending tool 112 and, in certain embodiments, a second bending tool 114. It can be appreciated that the bending station 110 may comprise more bending tools 112, 114 than those shown in FIG. 1. Also, the bending tools 112, 114 shown in FIG. 1 may be oriented in a position other than the positions shown in FIG. 1.

The first bending tool 112 and the second bending tool 114 may be conventional in the art. In an embodiment, the first bending tool 112 is a ring-type mold and the second bending tool 114 is a full-face mold. Suitable embodiments of the first bending tool 112 and the second bending tool 114 are also described in International Publication No. WO 2016/189319 A1, the entire disclosure of which is hereby incorporated by reference.

As illustrated in FIG. 1, the first bending tool 112 may be a female tool. As illustrated best in FIG. 2, in an embodiment, the first bending tool 112 has a shaping surface 116 for receiving the glass sheet 106, in particular a concave shaping surface. More particularly, the first bending tool 112 has an upper shaping surface 116 for receiving the glass sheet 106 thereon. After the glass sheet 106 has been received on the shaping surface 116, the glass sheet 106 is supported thereon. The first bending tool 112 may also support a stack of glass sheets thereon, in particular a nested pair separated by a suitable parting agent such as calcium carbonate.

Figure 2:
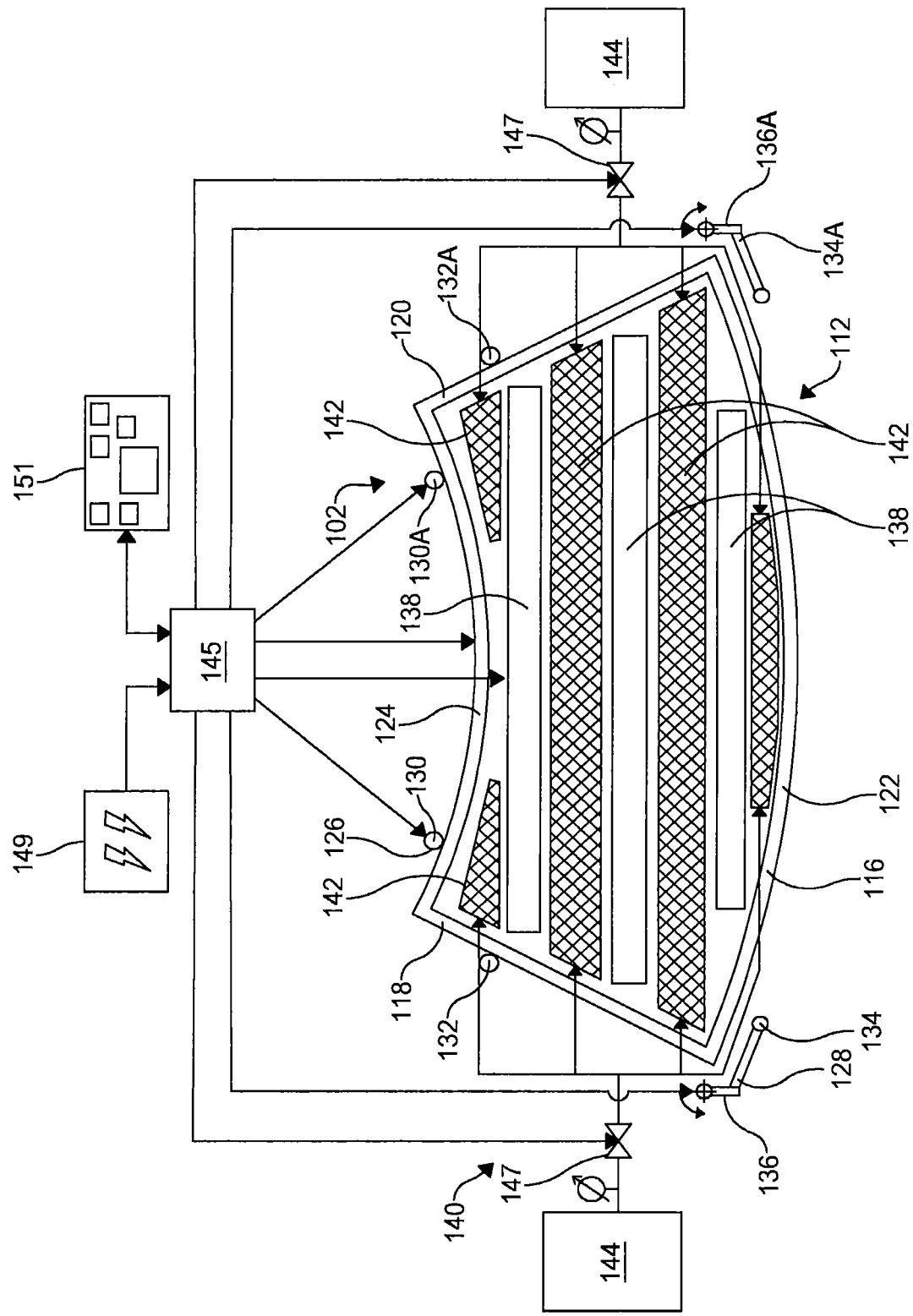
FIG. 2 is a top view of a portion of the glass shaping line of FIG. 1.

As illustrated best in FIG. 2, the first bending tool 112 may have a generally rectangular outline or periphery configured to support a glass sheet 106 also having a rectangular outline. In this embodiment, the first bending tool 112 has a first segment 118 and a second segment 120. Positioned at one end of the first segment 118 and the second segment 120 is a third segment 122. Positioned at another end of the first segment 118 and the second segment 120 is a fourth segment 124. When provided, the segments 118-124 define the generally rectangular outline. However, the first bending tool may have other configurations. For example, in an embodiment, the first segment may not be provided in a parallel relationship with the second segment. In other embodiments, the third segment may not be provided in a parallel relationship with the fourth segment. In still other embodiments, the outline of the first bending tool may be trapezoidal or have other forms suitably configured to support the particular glass sheet to be shaped. Also, as is illustrated in FIG. 2, one or more of the segments 118-124 may comprise one or more curved edges.

Also, in certain embodiments, the bending station 110 includes a centering device 102. The centering device 102 may be used to regulate positioning of the glass sheet 106 before it is deposited on the first bending tool 112. As shown in FIG. 2, the centering device 102 may comprise a plurality of positioners 126, 128. The positioners 126, 128 may be disposed about a peripheral edge of the first bending tool 112 to facilitate positioning the glass sheet 106 with respect to the first bending tool 112 before the glass sheet 106 has been shaped.

As illustrated best in FIG. 2, a first positioner 126, which may be moved vertically in an upward direction and a downward direction, is configured to adjust the position the glass sheet 106 relative to the shaping surface 116 before the glass sheet 106 is deposited on the shaping surface 116. In other embodiments, the first positioner 126 is configured to adjust the position the glass sheet 106 relative to the shaping surface 116 after the glass sheet 106 is deposited on the shaping surface 116. In an embodiment, the first positioner 126 may include one or more portions 130, 130A that contact a leading edge of the glass sheet 106 when the sheet is being positioned. In another embodiment, the first positioner 126 may include separate portions 132, 132A that contact opposite sides of the glass sheet 106. In these embodiments, the first positioner 126 may also act as a stopper, which prevents the glass sheet 106 from moving beyond the first bending tool 112. After the glass sheet 106 is positioned, the portions 130, 130A, 132, 132A of the first positioner 126 contacting the glass sheet 106 may be retracted or moved vertically in a downward direction so as to not interfere with one or more of the bending tools 112, 114 during bending of the glass sheet 106. The centering device 102 may also comprise a second positioner 128. In an embodiment, the second positioner 128 is configured to adjust the position the glass sheet 106 relative to the shaping surface 116 before the glass sheet 106 is deposited on the shaping surface 116. In another embodiment, the second positioner 128 is configured to adjust the position the glass sheet 106 relative to the shaping surface 116 after the glass sheet 106 is deposited on the shaping surface 116. In these embodiments, the second positioner 128 may include one or more portions 134, 134A that contact a trailing edge of the glass sheet 106 when the sheet is being positioned. The portions 134, 134A of the second positioner 128 contacting the trailing edge of the glass sheet 106 may each be attached to a pivot arm 136, 136A. After the glass sheet 106 is located entirely within the bending station 110, the pivot arms 136, 136A may rotate to bring the second positioner 128 into contact with the glass sheet 106. After the glass sheet 106 is positioned, the portions 134, 134A of the second positioner 128 contacting the glass sheet 106 may be rotated away from the glass sheet 106 so as to not interfere with one or more of the bending tools 112, 114 during bending of the glass sheet 106.

Referring back to FIG. 1, a plurality of rollers 138 are provided for conveying the glass sheet 106 to a location above the first bending tool 112. It is preferred that each roller of the plurality of rollers 138 rotates to convey the glass sheet 106 in a direction of glass travel. Also, it is preferred that the plurality of rollers 138 convey the glass sheet 106 at a height or distance above the first bending tool 112 when the first bending tool 112 is in a rest position. It may also be preferred that the height that the plurality of rollers 138 conveys the glass sheet 106 at is substantially constant.

Figure 3:
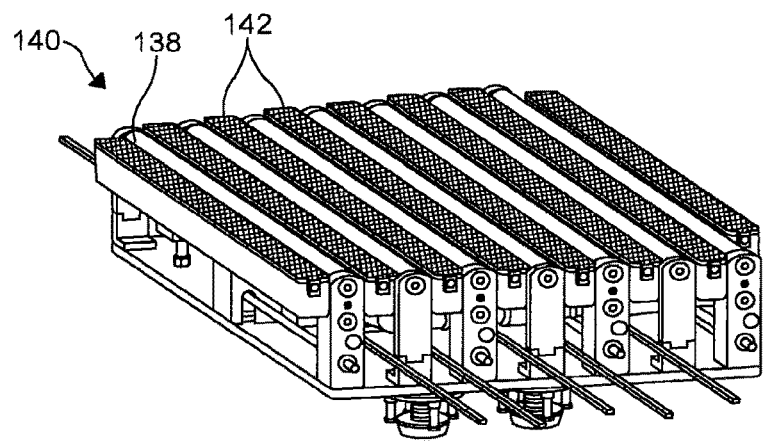
FIG. 3 is a perspective view of an embodiment of a portion of a bending station suitable for use in the glass shaping line of FIG. 1.
Figure 4:
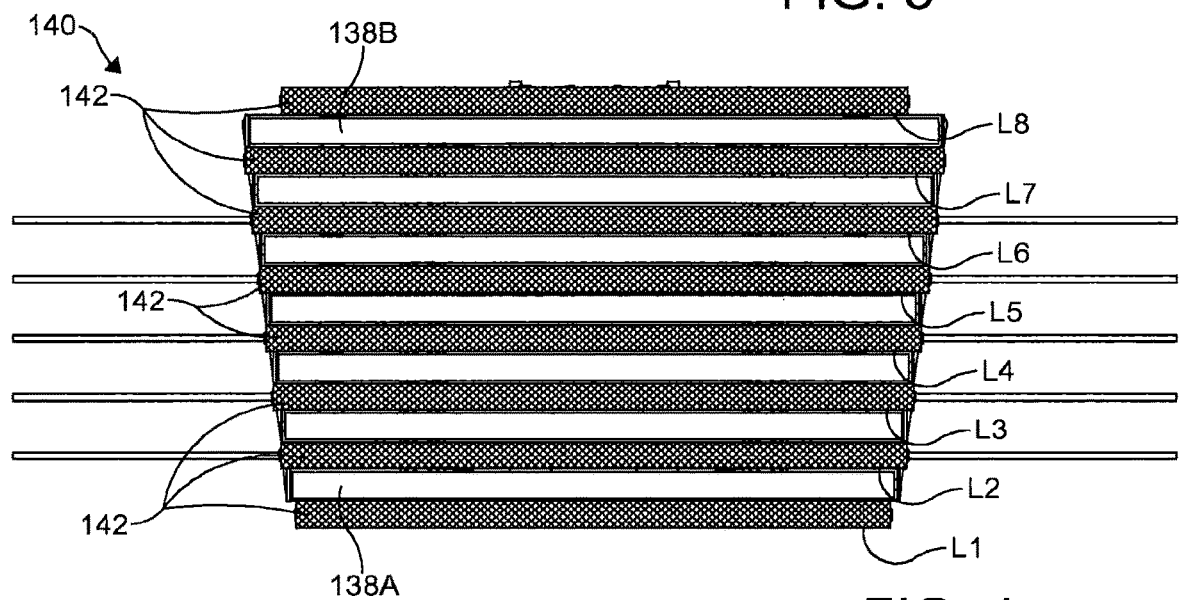
FIG. 4 is a top view of the portion of the bending station of FIG. 3 with the plurality of rollers removed.

Once the glass sheet 106 exits the preheating furnace 104, the glass sheet 106 is transferred from the rollers 108 in the preheating furnace 104 to the plurality of rollers 138. As illustrated in FIG. 2, in certain embodiments, the plurality of rollers 138 may comprise rollers that are of different lengths. In other embodiments (not depicted), the plurality of rollers may comprises rollers of substantially equal lengths. As illustrated in FIGS. 1-3, each roller of the plurality of rollers 138 is spaced apart from an adjacent roller. The spaces provided between the rollers may be equal in size. It is preferred that each roller of the plurality of rollers 138 is moveable in that each roller can be moved vertically in a downward direction or in an upward direction.

The glass shaping line 100 also comprises a fluid pad assembly 140. The fluid pad assembly 140 facilitates positioning the glass sheet 106 on the first bending tool 112 and transferring the glass sheet 106 from the plurality of rollers 138 to the first bending tool 112. The fluid pad assembly 140 comprises one or more fluid pads 142. It is preferred that a plurality of fluid pads 142 are provided. When a plurality of fluid pads 142 are provided, the fluid pads 142 may be configured as an array.

In certain embodiments, the fluid pad assembly 140 is moveable vertically in a downward direction or in an upward direction. In embodiments where the fluid pad assembly 140 is moveable vertically, the one or more fluid pads 142 are also moveable vertically in a downward direction or in an upward direction. In one such embodiment, the fluid pad assembly 140 is connected to the plurality of rollers 138 in such a manner that the fluid pad assembly 140 moves vertically in a downward direction or in an upward direction with the plurality of rollers 138. In another such embodiment, movement of the fluid pad assembly 140 and the plurality of rollers 138 is simultaneous. Thus, in this embodiment, the fluid pad assembly 140 moves vertically in a downward direction or in an upward direction when the plurality of rollers 138 move vertically in the downward direction or the upward direction. In yet another embodiment, when the plurality of rollers 138 move vertically in a downward direction or in an upward direction, the fluid pad assembly 140 moves vertically in the same direction as the plurality of rollers 138. In this embodiment, movement of the fluid pad assembly 140 and the plurality of rollers 138 may be simultaneous. For example, when the plurality of rollers 138 move vertically in a downward direction, the fluid pad assembly 140 moves vertically in a downward direction, which may be at the same time that the plurality of rollers 138 move. Also, in this embodiment, when the plurality of rollers 138 move vertically in an upward direction, the fluid pad assembly 140 may move vertically in an upward direction at the same time that the plurality of rollers 138 move. In other embodiments, the fluid pad assembly 140 is not moveable vertically.

As mentioned above, the glass sheet 106 has a first major surface and a second major surface. The fluid pad assembly 140 delivers a flow of fluid to one of the major surfaces of the of the glass sheet 106. In certain embodiments, the first major surface of the glass sheet 106 faces the fluid pad assembly 140. In these embodiments, the second major surface may face the second bending tool 114. Thus, in these embodiments, the fluid pad assembly 140 delivers the flow of fluid to the first major surface of the of the glass sheet 106. It is preferred that each fluid pad 142 provided is configured to deliver a flow of fluid to a major surface of the glass sheet 106. When the first major surface of the glass sheet 106 faces a plurality of fluid pads 142, the fluid pads 142 each deliver a flow of fluid to the first major surface of the glass sheet 106.

Each fluid pad 142 is positioned so that the flow of fluid can be delivered and distributed to the major surface of the glass sheet 106. The position of a particular fluid pad 142 relative to the glass sheet 106 may be selected based on the shape of the glass sheet 106. In some embodiments, the fluid pad assembly 140 may comprise a fluid pad 142 which is positioned below at least a portion of the leading edge of the glass sheet 106 and another fluid pad 142 which is positioned below at least a portion of the trailing edge of the glass sheet 106 before the glass sheet 106 is deposited on first bending tool 112. This arrangement is particularly preferred when a leading edge and/or a trailing edge of the glass sheet comprises a portion which is curved. Also, referring now to FIGS. 1-3, it is preferred that a fluid pad 142 is positioned in at least one of the spaces provided between adjacent rollers of the plurality of rollers 138. Preferably, a fluid pad 142 is positioned in each space provided between adjacent rollers of the plurality of rollers 138. As illustrated in FIGS. 1-4, the fluid pads 142 are spaced apart from each other. In an embodiment, the fluid pads 142 are equally spaced apart from each other and, as shown in FIGS. 1-3, a moveable roller 138 may be provided in each space provided between adjacent fluid pads 142.

The number of rollers of the plurality of rollers 138 and the number of fluid pads 142 of the fluid pad assembly 140 provided may depend on the size and shape of the glass sheet 106. In embodiments where the fluid pad assembly 140 comprises a plurality of fluid pads 142, the number of fluid pads 142 provided may be the same as the number of rollers of the plurality of rollers 138 that are provided. In this embodiment, which is not depicted, the number of fluid pads 142 provided is n and the number of rollers of the plurality of rollers 138 provided is n. In other embodiments, the number of fluid pads 142 provided may be less than the number of rollers of the plurality of rollers 138 that are provided. In this embodiment, which is depicted in FIG. 1, number of rollers of the plurality of rollers 138 provided is n and the number of fluid pads 142 provided is less than n. For example, in this embodiment, the number of fluid pads 142 provided may be n−1. However, in certain embodiments, it is preferred that the number of fluid pads 142 provided is greater than the number of rollers of the plurality of rollers 138 that are provided. In these embodiments, the number of rollers of the plurality of rollers 138 provided may be n and the number of fluid pads 142 provided is greater than n. For example, as shown in the embodiments depicted in FIGS. 2-4, the number of fluid pads 142 provided may be n+1. In these embodiments, a roller 138A, which is the roller 138A of the plurality of rollers 138 nearest a leading edge of the glass sheet 106 before the glass sheet 106 is deposited on the first bending tool 112, is provided between a pair of fluid pads 142 and another roller 138B, which is the roller 138B of the plurality of rollers 138 nearest a trailing edge of the glass sheet 106 before the glass sheet 106 is deposited on the first bending tool 112, is provided between a pair of fluid pads 142. Further, in this embodiment, each roller of the plurality of rollers 138 may be provided between a pair of fluid pads 142.

The flow of fluid delivered by the fluid pad assembly 140 contacts the glass sheet 106 and supports at least a portion of the glass sheet 106 above the first bending tool 112. The flow of fluid delivered by the fluid pad assembly 140 may support the at least a portion of the glass sheet 106 for a predetermined period of time. However, as the glass sheet 106 is deposited on the first bending tool 112, it should be appreciated that the glass sheet 106 is only supported by the flow of fluid temporarily. In these embodiments, it is preferred that the flow of fluid is distributed to the glass sheet 106 in such a manner that more fluid flow is provided near the trailing edge of the glass sheet 106 then is provided near the leading edge of the glass sheet 106. It is also preferred that the flow of fluid is distributed to the glass sheet 106 in such a manner that fluid is equally distributed across the glass sheet 106 in a direction perpendicular to glass travel.

It is preferred that the glass sheet 106 is supported above the first bending tool 112 at a height which creates a space between the glass sheet 106 and each roller of the plurality of rollers 138. However, in certain embodiments, the method may be practiced when a space is not provided between one or more portions of the glass sheet 106 and one or more rollers of the plurality of rollers 138. Further, in certain embodiments, the flow or fluid delivered to the glass sheet 106 moves the glass sheet 106 vertically in an upward direction or raises the height of the glass sheet 106 above the height that the glass sheet 106 is conveyed on by the plurality of rollers 138. However, it is preferred that the flow of fluid does not move the glass sheet 106 vertically in an upward direction to a height that places the glass sheet 106 in contact with the second bending tool 114 or such that glass sheet 106 is deposited on the second bending tool 114. In other embodiments, the flow or fluid delivered to the glass sheet 106 supports the glass sheet 106 but does not move the glass sheet 106 vertically in an upward direction or raise the height of the glass sheet 106 above the height that the glass sheet 106 is conveyed on by the plurality of rollers 138. In still other embodiments, the flow or fluid delivered to the glass sheet 106 moves the glass sheet vertically in an upward direction a distance required to create a space between the glass sheet 106 and each roller of the plurality of rollers 138.

Creating a space between the glass sheet 106 and each roller of the plurality of rollers 138 facilitates positioning the glass sheet 106 with respect to the first bending tool 112. However, in certain embodiments, the glass sheet 106 can still be positioned relative to the first bending tool 112 when a space is not provided between one or more portions of the glass sheet 106 and one or more rollers of the plurality of rollers 138. When the glass sheet 106 is positioned relative to the shaping surface 116 of the first bending tool 112 by the centering device 102, it is preferred that positioning or adjusting the position of the glass sheet 106 is made when at least a portion of the glass sheet 106 is supported by the flow of fluid. Preferably, the glass sheet 106 is supported above the first bending tool 112 and positioned as the plurality of rollers 138 and the fluid pad assembly 140 are retracted or moved vertically in a downward direction.

The flow of fluid is at a temperature when it is delivered to the glass sheet 106 which is preferably selected to reduce defects that might occur when the flow of fluid is delivered to the glass sheet 106. Preferably, the temperature of the flow of fluid is selected to be 18-550° C. More preferably, the temperature of the flow of fluid is 350-450° C. when the flow of fluid is delivered to the glass sheet 106.

In embodiments where the temperature of the flow of fluid is selected, the flow of fluid may be heated. In these embodiments, the flow of fluid may be heated before being received by the fluid pad assembly 140. In other embodiments, the flow of fluid may be heated after it is received by the fluid pad assembly 140. In these embodiments, one or more heating elements 143 may be provided within the fluid pad assembly 140 to heat the flow of fluid received by the fluid pad assembly 140. In the embodiments described above, the flow of fluid is heated before it is discharged from the fluid pad assembly 140. Alternatively, the temperature of the flow of fluid may be selected such that the heating is not required. In this embodiment, the flow of fluid can be provided at an ambient temperature.

To provide the flow of fluid to the major surface of the glass sheet 106, the fluid pad assembly 140 is in fluid communication with one or more sources of fluid 144, in particular one or more sources of pressurized fluid. In an embodiment, the fluid comprises air. In this embodiment, the one or more sources of fluid 144 may be a source of pressurized air. In other embodiments, the method may be practiced utilizing fluids which comprise other gases or gaseous mixtures. For example, the fluid may comprise gaseous nitrogen in a substantially purified form, steam, or another compound in a gas phase having similar properties. Thus, other sources of fluid may be provided.

Referring back to FIG. 2, in an embodiment, the flow of fluid from the one or more sources of fluid 144 to the fluid pad assembly 140 is regulated by one or more controllers 145. The one or more controllers 145 regulate the flow of fluid via one or more valves 147. Each valve of the one or more valves 147 may enable fluid communication between the one or more sources of fluid 144 and the fluid pad assembly 140. In an embodiment, the one or more controllers 145 are in communication with the one or more valves 147 to provide signals to the one or more valves 147. When it is desired to provide the flow of fluid, the one or more controllers 145 may provide a signal to the one or more valves 147. When the one or more valves 147 receive a signal from the one or more controllers 145, the one or more valves 147 may be urged into an open position. In this embodiment, when at least one valve of the one or more valves 147 is an open position, the flow of fluid from the one or more sources of fluid 144 is provided to the fluid pad assembly 140.

After at least a portion of the glass sheet 106 is supported by the flow of fluid, the one or more valves 147 may receive another signal from the one or more controllers 145 which urges the one or more valves 147 into a closed position. In other embodiments, urging the one or more valves 147 into a closed position occurs when the one or more valves 147 do not receive a signal from the one or more controllers 145. In both embodiments, when the one or more valves 147 are in a closed position, the flow of fluid to the fluid pad assembly 140 is terminated. When the flow of fluid to the fluid pad assembly 140 is terminated, the flow of fluid to the major surface of the glass sheet 106 will terminate.

In some embodiments, the one or more valves 147 are urged into a closed position after at least a portion of the glass sheet 106 is supported by the flow of fluid. Thus, in these embodiments, the flow of fluid delivered to the major surface of the glass sheet 106 terminates after at least a portion of the glass sheet 106 is supported by the flow of fluid. Also, in these embodiments, the flow of fluid delivered to the major surface of the glass sheet 106 may be terminated after the position of the glass sheet 106 has been adjusted relative to the shaping surface of the first bending tool 112. In an embodiment, the flow of fluid delivered to the major surface of the glass sheet 106 is terminated before the glass sheet 106 is deposited on the shaping surface of the first bending tool 112. In another embodiment, the flow of fluid delivered to the major surface of the glass sheet 106 is terminated after the glass sheet 106 is deposited on the shaping surface of the first bending tool 112.

In another embodiment, the one or more valves 147 are urged into a closed position after the plurality of rollers 138 move vertically in a downward direction. Thus, in this embodiment, the flow of fluid delivered to the major surface of the glass sheet 106 terminates after the plurality of rollers 138 move vertically in a downward direction. However, in other embodiments, the one or more valves 147 are urged into a closed position at the same time that the plurality of rollers 138 begin to move vertically in a downward direction. In these embodiments, the flow of fluid delivered to the major surface of the glass sheet 106 may terminate as the plurality of rollers 138 move vertically in a downward direction or after the plurality of rollers are in a rest position. Also, in these embodiments, the flow of fluid delivered to the major surface of the glass sheet 106 may terminate before or after the glass sheet 106 is deposited on the shaping surface of the first bending tool 112. In still other embodiments, the one or more valves 147 are urged into a closed position and the plurality of rollers 138 do not move vertically. In these embodiments, it is preferred that the flow of fluid delivered to the major surface of the glass sheet 106 terminates before or after the glass sheet 106 is deposited on the shaping surface of the first bending tool 112. In the embodiments described above, the one or more valves 147 may be urged into a closed position after the position of the glass sheet 106 has been adjusted relative to the shaping surface of the first bending tool 112. Thus, in these embodiments, the flow of fluid delivered to the major surface of the glass sheet 106 is terminated after the position of the glass sheet 106 has been adjusted relative to the shaping surface of the first bending tool 112.

The one or more controllers 145 may also be in communication with and provide signals to the centering device 102 to regulate positioning of the glass sheet 106. In an embodiment, the one or more controllers 145 provide signals to the first positioner 126 and/or the second positioner 128. In an embodiment, when a signal is received by the first positioner 126, one or more portions 132, 132A of the first positioner 126 move from a first configuration vertically in an upward direction to a second configuration where the one or more portions 132, 132A of the first positioner 126 contact the glass sheet 106 and adjust the position the glass sheet 106 relative to the shaping surface 116. In another embodiment, when a signal is received by the first positioner 126, the one or more portions 132, 132A of the first positioner 126 move from the second configuration vertically in a downward direction to the first configuration so that they do not interfere with one or more of the bending tools 112, 114 during bending of the glass sheet 106. In other embodiments, vertical movement of the one or more portions 132, 132A of the first positioner 126 in an upward direction or in a downward direction may occur when a signal is not provided by the one or more controllers 145 to the first positioner 126. In certain embodiments, a signal may also be received by the second positioner 128. In one such embodiment, when a signal is received by the second positioner 128, one or more portions 134, 134A of the second positioner 128 may be rotated from a first configuration toward the glass sheet 106 to a second configuration to bring the second positioner 128 into contact with the glass sheet 106 and adjust the position the glass sheet 106 relative to the shaping surface 116. After the glass sheet 106 is positioned, the second positioner 128 may receive another signal from the one or more controllers 145 which rotates the one or more portions 134, 134A of the second positioner 128 from the second configuration away from the glass sheet 106 to the first configuration so as to not interfere with one or more of the bending tools 112, 114 during bending of the glass sheet 106. In other embodiments, rotation of the second positioner 128 toward or away from the glass sheet 106 occurs when the second positioner 128 does not receive a signal from the one or more controllers 145. In some embodiments, the one or more controllers 145 are used to regulate the flow of fluid from the one or more sources of fluid 144 to the fluid pad assembly 140 and to provide signals to the centering device 102 to regulate positioning of the glass sheet 106. Preferably, the one or more controllers 145 regulates the flow of fluid to the fluid pad assembly 140 to support the glass sheet 106 and provides a signal to the centering device 102 to regulate positioning of the glass sheet 106 so that the position of the glass sheet 106 is regulated whilst at least a portion of the glass sheet 106 is supported above the first bending tool by the flow of fluid.

The one or more controllers 145 may also be in communication with and provide signals to the first bending tool 112 and a drive mechanism (not depicted) which enables movement of the plurality or rollers 138 and the fluid pad assembly 140. The signals provided by the one or more controllers 145 to the first bending tool 112 and the drive mechanism (not depicted) may direct movement of the first bending tool 112, plurality or rollers 138, and/or fluid pad assembly 140 vertically in a downward direction or in an upward direction. It should also be appreciated that, in certain embodiments, the one or more controllers 145 may also be in communication with and provide a signal to the second bending tool 114 to direct movement of the second bending tool 114 vertically in a downward direction or in an upward direction.

In certain embodiments, the one or more controllers 145 may operate and/or provide the signals described above under the control of a set of programming instructions, which may also be referred to as software. The one or more controllers 145 may include a memory (not depicted) in which programming instructions are stored. In an embodiment, the set of programming instructions enables the one or more controllers 145 to regulate the flow of fluid, positioning of the glass substrate 106 relative to the shaping surface 116, and/or movement of the bending tools 112, 114, plurality or rollers 138, and/or fluid pad assembly 140 in a predetermined sequence.

The one or more controllers 145 may also receive signals. For example, the one or more controllers 145 may be in communication with and receive signals from a power supply 149 and/or an operator control device 151. In other embodiments, the one or more controllers 145 may receive a signal from the centering device 102, first bending tool 112, second bending tool 114, one or more valves 147, and/or the drive mechanism.

As noted above, the flow of fluid is provided from the one or more sources of fluid 144 to the fluid pad assembly 140. The flow of fluid is provided from the one or more sources of fluid 144 at a first pressure. In an embodiment, the first pressure is 60 psi or more. However, in other embodiments, the first pressure may be less than 60 psi. In certain embodiments, the pressure of the flow of fluid is reduced within the fluid pad assembly 140 so that the flow of fluid delivered to the glass sheet 106 supports the glass sheet 106 above the first bending tool 112 but does not move the glass sheet 106 vertically in an upward direction to a height that places the glass sheet 106 in contact with the second bending tool 114. Thus, within the fluid pad assembly 140, in these embodiments, the flow of fluid is at a second pressure. In these embodiments, the first pressure of the flow of fluid is greater than the second pressure of the flow of fluid. In an embodiment, the pressure of the flow of fluid is 5 psi or less within the fluid pad assembly 140. More particularly, in this embodiment, the pressure of the flow of fluid is 5 psi or less within each fluid pad 142.

Preferably, the flow of fluid is provided as a pulse and for a relatively short period of time. For example, in an embodiment, the flow of fluid is provided to the fluid pad assembly 140 as a pulse and for 1 second or less. Preferably, the pulse is provided for between 0.1-1 second. More preferably, in these embodiments, the pulse is provided for 0.5 seconds or less. When the flow of fluid is provided as a pulse to the fluid pad assembly 140, it is preferred that the fluid pad assembly 140 delivers the flow of fluid as a pulse to the major surface of the of the glass sheet 106 and for the times described above. Also, in certain embodiments, it is preferred that the flow of fluid from the fluid pad assembly 140 to the major surface of the of the glass sheet 106 ends after the plurality of rollers 138 begin to move vertically in a downward direction. Thus, when the flow of fluid is provided as a pulse, the pulse of fluid may begin when the plurality of rollers are in a first position and ends when the plurality of rollers 138 move from the first position vertically in a downward direction toward the first bending tool 112.

Figure 5:
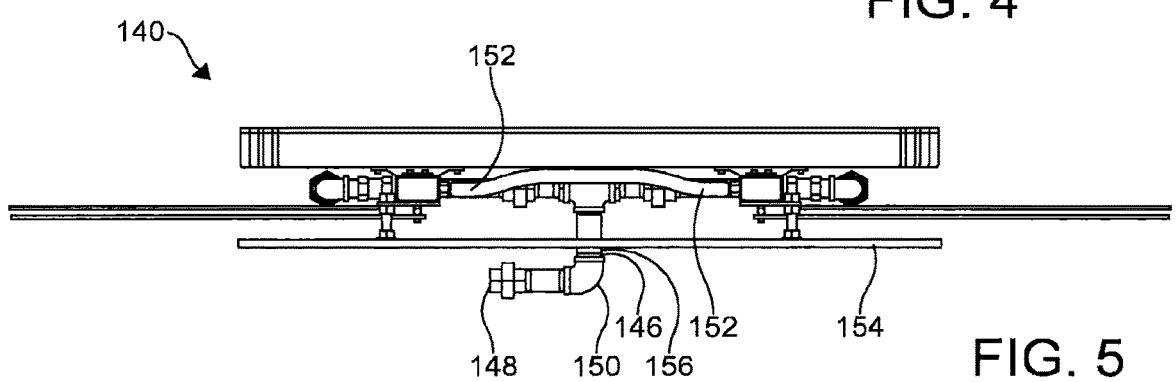
FIG. 5 is a side view of the portion of the bending station of FIG. 4.

As illustrated in FIG. 2, the fluid pad assembly 140 may be in fluid communication with two sources of fluid 144. In this embodiment, the sources of fluid 144 provide pressurized fluid to the fluid pad assembly 140 and separate conduits are utilized to provide the pressurized fluid to opposite sides of the fluid pads 142. In another embodiment, like the one illustrated in FIGS. 3-5, the fluid pad assembly 140 is in fluid communication with a single source of fluid 144. As best illustrated in FIG. 5, in this embodiment, a fluid distribution manifold 146 is provided. The fluid distribution manifold 146 has an inlet 148 for receiving the flow of fluid from the source of fluid 144. The inlet 148 is in fluid communication with an inlet portion 150. The inlet portion 150 is in fluid communication with two or more fluid conduits 152. The fluid conduits 152 are utilized to distribute fluid to opposite sides of the fluid pads 142. The two or more fluid conduits 152 may also be attached to and utilized to support the fluid pads 142. Each fluid conduit 152 is in fluid communication with one or more fluid pads 142 and, in certain embodiments, may be in fluid communication with each fluid pad 142. The fluid distribution manifold 146 may be attached to and supported by a platform 154. In this embodiment, the inlet portion 150 of the fluid distribution manifold may extend through an opening 156 in the platform 154.

Each fluid pad 142 is of a predetermined length $L_x$. In the embodiments illustrated, the length $L_1$-$L_8$ of each fluid pad 142 is provided in a perpendicular relationship with the direction of glass travel. In an embodiment, like the one illustrated in FIG. 4, each fluid pad 142 is of a different length $L_1$-$L_8$. In this embodiment, the lengths $L_1$-$L_7$ of the fluid pads 142 decrease in the direction of glass travel. In other embodiments (not depicted), two or more fluid pads may be of the same or substantially the same length. Each fluid pad 142 is also of a predetermined width. In the embodiments illustrated, the width of each fluid pad 142 is provided in a parallel relationship with the direction of glass travel. Also, in certain embodiments, the widths of the fluid pads 142 may be equal to each other.

Various embodiments of the fluid pads 142 will now be described with reference to FIGS. 6-16. While only one fluid pad 142 will be described below, it should be appreciated that each fluid pad of the fluid pad assembly can be configured as described. Alternatively, in certain embodiments, the fluid pad assembly may include one or more fluid pads that are configured as described below.

As illustrated, in certain embodiments, the fluid pad 142 may have edges which are sharply defined and comprise one or more planar outer surfaces. In one such embodiment, which is illustrated best in FIGS. 6, 9, and 13, the fluid pad 142 may be of a generally rectangular shape. However, in other embodiments, like the one illustrated in FIG. 2, a fluid pad may be of another polygonal shape. In still other embodiments (not depicted), the fluid pad may be defined by one or more curved surfaces.

Referring now to FIGS. 6-16, in an embodiment, each fluid pad 142 has at least one fluid inlet 158 for receiving a flow of fluid from a source of fluid. In an embodiment, the flow of fluid is communicated to the fluid inlet 158 via the fluid distribution manifold 146. In another embodiment, each fluid pad 142 has a pair of fluid inlets for receiving a flow of fluid from the fluid distribution manifold 146. In this embodiment, each fluid inlet 158 of the pair of inlets is attached to and in fluid communication with a fluid conduit 152 of the fluid distribution manifold 146.

Each fluid inlet 158 is formed in a main body portion 160 of the fluid pad 142. Preferably, each fluid inlet 158 is formed in a lower wall 162 of the main body portion 160. A pair of opposed sidewalls 164, 166 may be attached to opposite sides of the lower wall 162. A pair of opposed end walls 168, 170 may be attached to opposite ends of the lower wall 162.

The fluid pad 142 comprises a chamber 172, which is at least partially defined by the lower wall 162, opposed sidewalls 164, 166, and opposed end walls 168, 170. A diffuser plate 174 is provided within the chamber 172 and adjacent each fluid inlet 158. In this position, the diffuser plate 174 is utilized to distribute fluid laterally within an interior of the fluid pad 142 so that the flow of fluid is substantially uniform across the fluid pad 142 when it is discharged therefrom.

Preferably, the diffuser plate 174 is in a spaced apart relationship with the fluid inlet 158. More particularly, it is preferred that the relationship between the diffuser plate 174 and the fluid inlet 158 is such that the diffuser plate 174 receives the flow of fluid from the fluid inlet 158. After the diffuser plate receives the flow of fluid from the fluid inlet 158, the diffuser plate 174 is utilized to distribute fluid laterally within the fluid pad 142. Also, the diffuser plate 174 may be utilized to distribute fluid vertically within the fluid pad 142. In an embodiment, the diffuser plate may be a substantially solid member that has an opening which is aligned with the fluid inlet 158. In the embodiments illustrated in FIGS. 6-8, the fluid pad 142 comprises a pair of diffuser plates 174. As illustrated best in FIG. 7, each diffuser plate 174 is held in a spaced apart relationship with a corresponding fluid inlet 158 by one or more spacers 176 provided in the chamber 172. In these embodiments, the diffuser plates 174 may be similarly configured.

After passing by the diffuser plate 174, the flow of fluid may be directed vertically in an upward direction through the chamber 172 and toward a fluid outlet 178 of the fluid pad 142. Thus, the chamber 172 is provided between the fluid inlet 158 and the fluid outlet 178. Preferably, the fluid outlet 178 is provided adjacent the first major surface of the glass sheet 106 in order to provide enough fluid to support the glass sheet 106 without causing damage to the glass sheet 106. In an embodiment, the distance (in an upward direction) between the first major surface of the glass sheet 106 and the fluid outlet 178 is 5 mm or less. More preferably, the distance is 1 mm or less.

The flow of fluid is discharged from the fluid pad 142 via the fluid outlet 178. The fluid outlet 178 may comprise one or more openings 180 for discharging the flow of fluid. In embodiments where the one or more openings 180 comprise a plurality of openings, each opening of the one or more openings 180 may be of circular shape and have a diameter. In these embodiments, the diameters of the openings 180 may be the same size. In other embodiments, the one or more of the openings 180 may be of another shape. Preferably, the one or more openings 180 are formed in a cover member 182. In one such embodiment, which is illustrated in FIGS. 6-8, the fluid outlet 178 of the fluid pad 142 is defined by a porous cover member. In this embodiment, it is preferred that the one or more openings 180 comprises a plurality of openings and the openings of the plurality of openings are spaced apart from each other. Further, in this embodiment, it may be preferred that the spaces between adjacent openings of the plurality of openings are equal to each other. Thus, in certain embodiments, adjacent openings of the plurality of openings are equally spaced apart from each other.

In an embodiment, the porous cover member 182 may comprise a screen. In other embodiments (not depicted), the cover member 182 may comprise a mesh. In the embodiments described above, a wire woven cloth (not depicted) may be positioned over the fluid outlet 178. The wire woven cloth protects the glass sheet 106 from damage and assists in diffusing the flow of fluid after it is discharged from the fluid pad 142. In other embodiments, which are illustrated in FIGS. 9-16, the fluid outlet 178 of the fluid pad is defined by one or more nozzle openings 184.

In embodiments where the flow of fluid is heated after it is received by the fluid pad assembly 140, it is preferred that a heating element 143 is provided in the fluid pad 142. Preferably, the heating element 143 is positioned within the chamber 172. In these embodiments, the heating element 143 may generate heat via electrical resistance heating. The heating element 143 may extend substantially the entire length $L_x$ of the fluid pad 142. Preferably, the heating element 143 is positioned between the fluid inlet 158 and the fluid outlet 178. More particularly, in an embodiment, the heating element 143 is positioned between the diffuser plate 174 and the fluid outlet 178. In this position, the heating element 143 can heat a flow of fluid to a selected temperature before it is discharged from the fluid pad assembly 140 and contacts the glass sheet 106.

As illustrated best in FIGS. 9-10, the nozzle openings 184 may be aligned with each other in a direction perpendicular to glass travel. Alternatively, as illustrated best in FIG. 14, a nozzle opening 184 may be aligned with certain nozzle openings 184A and oriented at an acute angle with respect to other nozzle openings 186, 186A. In this embodiment, the nozzle opening 184 is provided at an acute angle with respect to two adjacent nozzle openings 186, 186A. The two adjacent nozzle openings 186, 186A separate the nozzle opening 184 from another nozzle opening 184A that it is aligned with.

The nozzle opening 184, 184A, 186 may be of a circular shape. However, the nozzle opening may be of another shape. In certain embodiments, the fluid pad 142 may comprise a plurality of nozzle openings 184, 184A, 186, 186A and two or more of the plurality of nozzle openings may be of the same shape. In this embodiment, the two or more nozzle openings may be of a circular shape. In another embodiment, the fluid pad 142 comprises the plurality of nozzle openings 184, 184A, 186, 186A and each nozzle opening is the same shape. In other embodiments (not depicted), the fluid pad may comprise a plurality of nozzle openings and two or more of the plurality of nozzle openings may be of different shapes.

Each nozzle opening 184, 184A, 186, 186A is provided as a portion of a nozzle 188, 190. Thus, the fluid pad 142 may comprise one or more nozzles 188, 190. In certain embodiments, like the ones illustrated in FIGS. 13-16, the nozzle 190 of may comprise a pair of nozzle openings 186, 186A. In these embodiments, the pair of nozzle openings 186, 186A may be of the same shape. Each nozzle 188, 190 is attached to and provided between the fluid pad sidewalls 164, 166 and is spaced apart from the fluid pad lower wall 162.

The one or more nozzles 188, 190 of a fluid pad can be configured in a similar manner or in another manner. In an embodiment, the nozzle 188, 190 comprises a body portion 192, 192A. The body portion 192, 192A may be formed of metal or another sufficiently rigid material. The body portion 192, 192A may at least partially define the fluid pad chamber 172.

A fluid inlet 194 is provided in the body portion 192, 192A and is in fluid communication with the chamber 172. When a nozzle 190 comprises a pair of nozzle openings 186, 186A, the body portion may comprise a pair of fluid inlets 194, 194A. The fluid inlet 194, 194A is in fluid communication with a fluid inlet portion 196, 196A, which may be of a cylindrical shape. The fluid inlet portion 196, 196A extends in an upward direction to a groove 198, 198A. An end of the fluid inlet portion 196, 196A is in fluid communication with an end of the groove 198, 198A. An opposite end of the groove 198, 198A is in fluid communication with the nozzle opening 186, 186A.

The groove 198, 198A may be of a generally conical shape. In an embodiment, the groove 198, 198A is of a frusto-conical shape. A baffle 200, 202, 202A may be disposed in the groove 198, 198A between the opposite ends of the groove 198, 198A. When provided, the baffle 200, 202, 202A may be secured in the groove 198, 198A to a wall portion 204, 204A. The wall portion 204, 204A at least partially defines the shape of the groove 198, 198A. In an embodiment, like the one illustrated in FIG. 12, the baffle 200 is secured to the wall portion 204 utilizing one or more fasteners 206. In another embodiment, like the one illustrated in FIG. 16, the baffle 202, 202A is secured to the wall portion 204 with a press fit.

In certain embodiments, like those shown in FIGS. 13-16, the nozzle 190 may comprise a pair of grooves 198, 198A. Each groove 198, 198A of the pair of grooves may as described above and, in these embodiments, a baffle 202, 202A may be disposed in each groove 198, 198A.

Referring back to FIG. 1, after being transported onto the plurality of rollers 138, the glass sheet 106 continues to move in the direction of glass travel. Before reaching the first positioner 126, a flow of fluid is discharged from the fluid pad assembly 140. The glass sheet 106 receives and is contacted by the flow of fluid from the fluid pad assembly 140. The flow of fluid supports at least a portion of the glass sheet 106. While supported, the position of the glass sheet 106 can be adjusted relative to the position of the shaping surface 116 of the first bending tool 112 by the first positioner 126 and/or second positioner 128. After adjusting the position of the glass sheet 106, the plurality of rollers 138 may be moved vertically in a downward direction to facilitate depositing the glass sheet 106 on the first bending tool 112. In other embodiments, the plurality of rollers 138 may be moved vertically in a downward direction once the glass sheet 106 is supported by the flow of fluid. In these embodiments, the plurality of rollers 138 may be moved in a direction toward the first bending tool 112 prior to the glass sheet 106 being deposited on the first bending tool 112. Also, in this embodiment, the fluid pad assembly 140 may move vertically in a downward direction toward the first bending tool 112 when the plurality of rollers 138 move as described above. Additionally, prior to depositing the glass sheet 106 on the first bending tool 112, the first bending tool 112 may move vertically in a direction toward the plurality of rollers 138. For example, in this embodiment, the first bending tool 112 may move from a rest position, which is illustrated best in FIG. 1, vertically in an upward direction toward the plurality of rollers 138. However, in other embodiments, it is preferred that the first bending tool 112 is stationary and remains in the rest position illustrated in FIG. 1 until the glass sheet 106 is deposited thereon. In still other embodiments, the plurality of rollers 138 may not move vertically prior to the glass sheet 106 being deposited on the first bending tool 112. Instead, in these embodiments, the supported glass sheet 106 is deposited on the first bending tool 112 by vertical movement of the first bending tool 112 in an upward direction from a rest position toward the plurality of rollers 138. It should be appreciated that, in embodiments where the first bending tool 112 is moving toward the plurality of rollers 138, the first bending tool 112 is also moving toward the glass sheet 106 prior to deposition of the glass sheet 106 on the first bending tool 112. In all of the above-described embodiments, at least a portion of the glass sheet 106 is supported by the flow of fluid and deposited on the shaping surface 116 of the first bending tool 112.

Advantageously, depositing the glass sheet 106 on the shaping surface 116 of the first bending tool 112 as described above and utilizing the glass shaping line 100, results in improved alignment between the glass sheet 106 and the shaping surface 116 prior to bending. The improved alignment imparts the glass sheet 106 with the desired properties and ensures the glass sheet 106 is of a high quality after bending. Furthermore, because at least a portion of the glass sheet 106 is not contacted by the plurality of rollers 138 immediately before the glass sheet 106 is deposited on the first bending tool 112, optical distortion caused by marks on the glass sheet 106 may be reduced when compared with other shaping methods and glass shaping lines.

If the glass sheet 106 is to be press bent, once the glass sheet 106 is deposited on the first bending tool 112, it is preferred that the first bending tool 112 moves toward the second bending tool 114, with the second bending tool 114 not moving, to press bend the glass sheet 106. In this embodiment, following movement of the first bending tool 112, the glass sheet 106 is press bent between the first bending tool 112 and the second bending tool 114. However, in other embodiments, the first bending tool 112 may move toward the second bending tool 114 and the second bending tool 114 may move toward the first bending tool 112. Alternatively, the second bending tool 114 may move toward the first bending tool 112, with the first bending tool 112 not moving. In any of these alternatives the objective is to effect relative movement between the first bending tool 112 and the second bending tool 114 to press bend the glass sheet 106 between the first bending tool 112 and the second bending tool 114.

During pressing, a vacuum may be drawn on passages 208 formed in the second bending tool 114 to facilitate forming the glass sheet 106 into a desired shape. Upon completion of shaping the glass sheet 106, the glass sheet 106 may be released from the second bending tool 114 by way of positive pressure being applied through the passages 208 of the second bending tool 114.

Upon completion of the bending process, a conveying device (not shown) serves to transport the shaped glass sheet 106 into a lehr 210. In the lehr 210, the shaped glass sheet 106 may be tempered or annealed as known in the art and cooled to a temperature at which handling can occur. The shaped glass sheet 106 may be used in the construction of a window for a vehicle, such as a windscreen, side window, sunroof or a rear window. Such a window may be monolithic or laminated.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A method of shaping a glass sheet, comprising:
   providing a glass sheet having a first major surface, a second major surface, and an edge extending between the first and second major surfaces;
   providing a glass shaping line comprising a preheating furnace followed by a bending station, the bending station comprising a centering device and a first bending tool, wherein the first bending tool is a ring-type mold having a shaping surface for receiving the glass sheet;
   conveying the glass sheet on a plurality of rollers through the preheating furnace to a location in the bending station wherein the glass sheet is directly above one or more of the plurality of rollers and wherein the entire glass sheet is directly above the first bending tool;
   thereafter, in the bending station:
   (i) supporting at least a portion of the glass sheet above the first bending tool by delivering a flow of fluid to the first major surface of the glass sheet;
   (ii) depositing the glass sheet on the shaping surface of the first bending tool; and
   (iii) contacting the edge of the glass sheet with the centering device to adjust the position of the glass sheet relative to the shaping surface of the first bending tool while at least a portion of the glass sheet is supported by the flow of fluid.

2. The method of claim 1, further comprising moving the plurality of rollers in a direction perpendicular to the direction of glass travel on the rollers and toward the first bending tool prior to depositing the glass sheet on the first bending tool.

3. The method of claim 1, further comprising supporting the glass sheet on the shaping surface of the first bending tool.

4. The method of claim 1, further comprising conveying the glass sheet on the plurality of rollers at a height and wherein the flow of fluid delivered to the first major surface of the glass sheet raises the glass sheet above the height.

5. The method of claim 1, further comprising discharging the flow of fluid from a fluid pad assembly.

6. The method of claim 5, wherein the fluid pad assembly comprises one or more fluid pads, wherein the flow of fluid is received by the fluid pad assembly at a first pressure and is at a second pressure within the one or more fluid pads, and wherein the first pressure of the flow of fluid is greater than the second pressure of the flow of fluid.

7. The method of claim 1, wherein the position of the glass sheet relative to the shaping surface of the first bending tool is adjusted prior to depositing the glass sheet on the shaping surface of the first bending tool.

8. The method of claim 1, wherein the position of the glass sheet relative to the shaping surface of the first bending tool is adjusted after depositing the glass sheet on the shaping surface of the first bending tool.

9. The method of claim 1, further comprising moving the first bending tool in a direction toward the plurality of rollers prior to depositing the glass sheet on the first bending tool.

10. The method of claim 1, wherein the shaping surface of the ring-type mold comprises a concave shaping surface for receiving the glass sheet.

11. The method of claim 1, wherein the bending station comprises a second bending tool, the second bending tool comprising a full-face mold, and wherein the method includes press bending the glass sheet between the first bending tool and the second bending tool.

12. The method according to claim 1, wherein the glass sheet is supported above the first bending tool at a height which creates a space between the glass sheet and each roller of the plurality of rollers.

13. The method according to claim 1, wherein when the glass sheet is supported above the first bending tool, a space is not provided between one or more portions of the glass sheet and one or more rollers of the plurality of rollers.

14. The method according to claim 1, wherein the flow of fluid does not move the glass sheet vertically in an upward direction to a height that places the glass sheet in contact with a second bending tool.

15. A method of shaping a glass sheet, comprising:
a) providing a glass sheet having a first major surface, a second major surface, and an edge extending between the first and second major surfaces;
b) providing a glass shaping line comprising a preheating furnace followed by a bending station, the bending station comprising a centering device and a first bending tool, wherein the first bending tool is a ring-type mold having a shaping surface for receiving the glass sheet;
c) conveying the glass sheet on a plurality of rollers through the preheating furnace to a location in the bending station wherein the glass sheet is directly above one or more of the plurality of rollers and wherein the entire glass sheet is directly above the first bending tool;
d) after step c) supporting at least a portion of the glass sheet in the bending station above the first bending tool and above one or more of the plurality of rollers by delivering a flow of fluid to the first major surface of the glass sheet;
e) depositing the glass sheet on the shaping surface of the first bending tool; and
f) contacting the edge of the glass sheet with the centering device to adjust the position of the glass sheet relative to the shaping surface of the first bending tool while at least a portion of the glass sheet is supported by the flow of fluid.

16. The method of claim 15, further comprising moving the first bending tool in a direction toward the plurality of rollers prior to depositing the glass sheet on the first bending tool.

17. A method of shaping a glass sheet, comprising:
providing a glass sheet having a first major surface, a second major surface, and an edge extending between the first and second major surfaces;
providing a glass shaping line comprising a preheating furnace followed by a bending station, the bending station comprising a centering device and a first bending tool, wherein the first bending tool is a ring-type mold having a shaping surface for receiving the glass sheet;
conveying the glass sheet on a plurality of rollers through the preheating furnace to a location in the bending station wherein the glass sheet is directly above one or more of the plurality of rollers and wherein the entire glass sheet is directly above the first bending tool, wherein each roller of the plurality of rollers is spaced apart from an adjacent roller;
supporting at least a portion of the glass sheet in the bending station above the first bending tool by delivering a flow of fluid between one roller of the plurality of rollers and an adjacent roller to the first major surface of the glass sheet;
depositing the glass sheet on the shaping surface of the first bending tool; and
contacting the edge of the glass sheet with the centering tool to adjust the position of the glass sheet relative to the shaping surface of the first bending tool while at least a portion of the glass sheet is supported by the flow of fluid.

18. The method of claim 17, further comprising moving the first bending tool in a direction toward the plurality of rollers prior to depositing the glass sheet on the first bending tool.

19. The method according to claim 17, wherein the glass sheet is supported above the first bending tool at a height which creates a space between the glass sheet and each roller of the plurality of rollers.

20. The method according to claim 17, wherein when the glass sheet is supported above the first bending tool, a space is not provided between one or more portions of the glass sheet and one or more rollers of the plurality of rollers.

* * * * *